US008955365B2

(12) United States Patent
do Amaral et al.

(10) Patent No.: US 8,955,365 B2
(45) Date of Patent: Feb. 17, 2015

(54) PERFORMANCE MONITORING AND PROGNOSTICS FOR AIRCRAFT PNEUMATIC CONTROL VALVES

(75) Inventors: Tiago Moraes do Amaral, Sao Jose dos Campos (BR); Lucas Campos Puttini, Sao Jose dos Campos (BR)

(73) Assignee: Embraer S.A., Sao Jose dos Campos (BR)

( * ) Notice: Subject to any disclaimer, the term of this patent is extended or adjusted under 35 U.S.C. 154(b) by 728 days.

(21) Appl. No.: 12/635,743

(22) Filed: Dec. 11, 2009

(65) Prior Publication Data

US 2010/0155634 A1    Jun. 24, 2010

Related U.S. Application Data

(60) Provisional application No. 61/140,357, filed on Dec. 23, 2008.

(51) Int. Cl.
*G01L 27/00* (2006.01)
*G05B 23/02* (2006.01)
*F16K 37/00* (2006.01)

(52) U.S. Cl.
CPC .......... *G05B 23/024* (2013.01); *G05B 23/0283* (2013.01); *F16K 37/0091* (2013.01); *G05B 2219/24077* (2013.01); *G05B 2219/25312* (2013.01)
USPC ............................. 73/1.72; 702/182; 702/188

(58) Field of Classification Search
USPC .............. 73/1.01, 1.72, 168; 702/33, 34, 183, 702/114, 182, 188; 251/129.01; 700/282
See application file for complete search history.

(56) References Cited

U.S. PATENT DOCUMENTS

| 3,813,990 | A | * | 6/1974 | Coppola et al. ..................... 91/1 |
| 5,566,091 | A | | 10/1996 | Schricker et al. |
| 5,616,824 | A | | 4/1997 | Abdel-Malek et al. |
| 6,131,609 | A | | 10/2000 | Metso et al. |
| 6,208,953 | B1 | * | 3/2001 | Milek et al. ....................... 703/7 |
| 6,745,107 | B1 | | 6/2004 | Miller |
| 6,954,683 | B2 | | 10/2005 | Junk et al. |
| 8,306,778 | B2 | * | 11/2012 | Leao et al. .................... 702/179 |
| 2005/0114090 | A1 | | 5/2005 | Black |
| 2007/0207656 | A1 | | 9/2007 | Miettinen |
| 2008/0004836 | A1 | | 1/2008 | Tewes |

FOREIGN PATENT DOCUMENTS

| EP | 0288034 A2 | 10/1988 |
| EP | 1895452 A1 | 5/2008 |

OTHER PUBLICATIONS

Byington C S et al: "A model-based approach to prognostics and health management for flight control actuators" Aerospace Conference, 2004. Proceedings. 2004 IEEE, IEEE, Piscataway, NJ, USA, vol. 6, pp. 3551-3562, XP010748482 (Mar. 6, 2004).

(Continued)

Primary Examiner — Randy W Gibson
Assistant Examiner — Natalie Huls
(74) Attorney, Agent, or Firm — Nixon & Vanderhye P.C.

(57) ABSTRACT

A method estimates the health state of an aircraft pneumatic control valve through indirect measurements of available sensors. Measurements from identical valves operating under the same condition are compared. Residues are translated into estimates of individual valve degradation state. Historical degradation states can be used to predict expected time to failure.

13 Claims, 9 Drawing Sheets

(56) References Cited

OTHER PUBLICATIONS

Black S et al: "Reconfigurable control and fault identification system," Aerospace Conference, 2004. Proceedings. 2004 IEEE, IEEE, Piscataway, NJ, USA, pp. 3481-3494, XP010748464 (Mar. 6, 2004).
Brotherton T et al: "A testbed for data fusion for engine diagnostics and prognostics" Aerospace Conference Proceedings, 2002. IEEE Mar. 9-16, 2002, Piscataway, NJ, USA, IEEE, vol. 6, pp. 3029-3042, XP010604872 (Mar. 9, 2002).
Xiaodong Zhang et al, "An integrated approach to bearing fault diagnostics and prognostics," American Control Conference, 2005, Proceedings of the 2005 Portland, OR, USA Jun. 8-10, 2005, Piscataway, NJ, USA, IEEE ), pp. 2750-2755, XP010820213 (Jun. 8, 2005).
European Search Report, EP 2 202 600 A3 (Oct. 13, 2010).
Aug. 27, 2012 Communication from European Patent Office (8 pages).
May 3, 2013 Communication to European Patent Office (7 pages).
Jun. 1, 2011 Communication from European Patent Office (5 pages).
Jun. 1, 2011 Communication from European Patent Office (21 pages).

* cited by examiner

PERFORMANCE MONITORING AND PROGNOSTICS FOR AIRCRAFT PNEUMATIC CONTROL VALVES

CROSS-REFERENCES TO RELATED APPLICATIONS

This application claims priority from provisional application No. 61/140,357 filed 23 Dec. 2008, and is related to commonly assigned U.S. patent application Ser. No. 12/636,392 filed 11 Dec. 2009, now U.S. Pat. No. 8,306,778 issued 6 Nov. 2012, entitled "Prognostics And Health Monitoring For Electro-Mechanical Systems And Components".

STATEMENT REGARDING FEDERALLY SPONSORED RESEARCH OR DEVELOPMENT

FIELD

The technology herein relates to in-place testing of mechanical equipment during operation, and more particularly to using indirect measurements to estimate the health state of an aircraft pneumatic control valve.

BACKGROUND AND SUMMARY

Most of the valves the average person sees in daily life are manually operated. For example, the faucet on your kitchen sink is controlled by a water valve. Moving the handle opens the valve to allow water to flow. Closing the valve handle stops the water from flowing. Different valves can be used to control different water flows. For example, a hot water valve can control hot water flow, and a cold water valve can control cold water flow.

A modern aircraft makes wide use of valves. Such valves can be employed to regulate process variables such as fluid flow, temperature and other. Typically however, instead of being actuated manually, the valves are controlled electrically. Often, pneumatic valves are connected in closed loop control systems. Generally speaking, in a modern pneumatic control loop, a fluid flow or other sensor downstream of the pneumatic valve monitors some characteristic of the flow of the fluid the valve controls. Monitored characteristics are fed back to a microprocessor or other circuit that is used to electrically control the valve opening. Very precise control of process parameters can be achieved using such modern pneumatic control loops.

Valve degradation and failure can be a significant problem in applications such as aircraft and industry that depend on proper operation of pneumatic value control systems. It is therefore generally desirable to be able to automatically monitor the health of pneumatic valve control systems. This can be especially valuable in aircraft and other contexts where it is not always convenient to inspect valve operation (e.g., during flight). Abnormal operation may indicate for example that significant degradation is taking place at the valve that can lead to functional failure in the future. Failure or degradation mechanisms can be, among others for example, abnormal friction levels leading to excessive wear between moving parts; air tubing clogging due to the deposition of contaminants; mechanical fatigue and rupture; uncontrolled air leakage at points that are subjected to different pressures; and other phenomena.

Sensors within the valves and along the controlled process may provide measurements that are useful not only for the process control loop, but also to identify abnormal operation and perform valve health monitoring. Besides measurements from process variables, a system's controller can make use of specific sensors to measure internal valve states, such as internal pressures and actuator positions. Internal sensors dedicated to the specific function of monitoring the health of pneumatic valves and their associated control loops can be used to allow more precise detection and isolation of failure modes of valve internal components. While many newer pneumatic valves include such internal sensors, older valve designs that may already be installed in the field often do not. Such internal sensors are thus rarely present in legacy designs due to functional restrictions, cost constraints, or other factors.

Measurements within the controlled process may also be affected by abnormal valve operation. Thus, such measurements can be used to provide indirect indications of the health of the valve. However, indirect measurements may not necessarily allow the root failure mode to be isolated, and are more subject to external disturbances that can mask degradation effects. By way of simple illustration, a decrease in water flow from the end of a garden hose could be attributable to wear of the water valve, but it also could be attributable to decrease in water pressure or a kink in the hose.

Some have used complex mathematics and dynamic system modeling to analytically estimate valve, controller and process states. The initial states of these components, system inputs and disturbances are recorded and fed into a processor that creates a dynamic model of how the system is expected to operate. Differences between the real system state and the state the model expects can be analyzed and translated into valve health estimations. Additional failure propagation and degradation evolution models provide a way to discover the effects of failure modes and to identify failure modes in a faulty system. A disadvantage of this approach is that models may not properly characterize the system due to incompleteness, inaccuracy or random parameter deviations of real systems from modeled ones. An additional disadvantage is that the modeling approach is complex. Anything so complex can introduce its own errors which can be mistaken for system errors. It is possible for a faulty diagnostic system to indicate a fault when there is no fault. Thus, while such modeling is useful, this approach has limitations. Further improvements are possible and desirable.

The exemplary illustrative non-limiting technology herein uses another approach to diagnosing problems: comparing signals and other parameters from two identical or similar processes operating under the same or similar conditions. If plural identical systems are subjected to the same environmental and operating conditions, one can expect their measured states to be very similar. Observed differences in measured states can therefore be associated with degradation taking place in one of the systems. Experience shows that it is relatively or extremely unlikely that both systems will present significant functional degradation at the same time. Thus, such differences can be used to identify a degraded system and to estimate its health.

In accordance with one aspect of exemplary illustrative non-limited implementations herein, measurements from identical valves operating under the same or similar conditions are compared. Differences are translated into estimates of individual valve degradation state. Historical degradation states can be used to predict expected time to failure. An exemplary illustrative non-limiting implementation for assessing the health of a pneumatic valve controlled system onboard an aircraft comprises monitoring the state of a first process controlled by a first pneumatic valve; monitoring the state of a second process controlled by a second pneumatic valve; comparing the monitored state of the first process with the monitored state of the second process to derive at least one comparison result; and ascertaining at least one parameter associated with the health of at least one of the first pneumatic valve and the second pneumatic valve in response at least in part to said comparison result.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Figure 1:
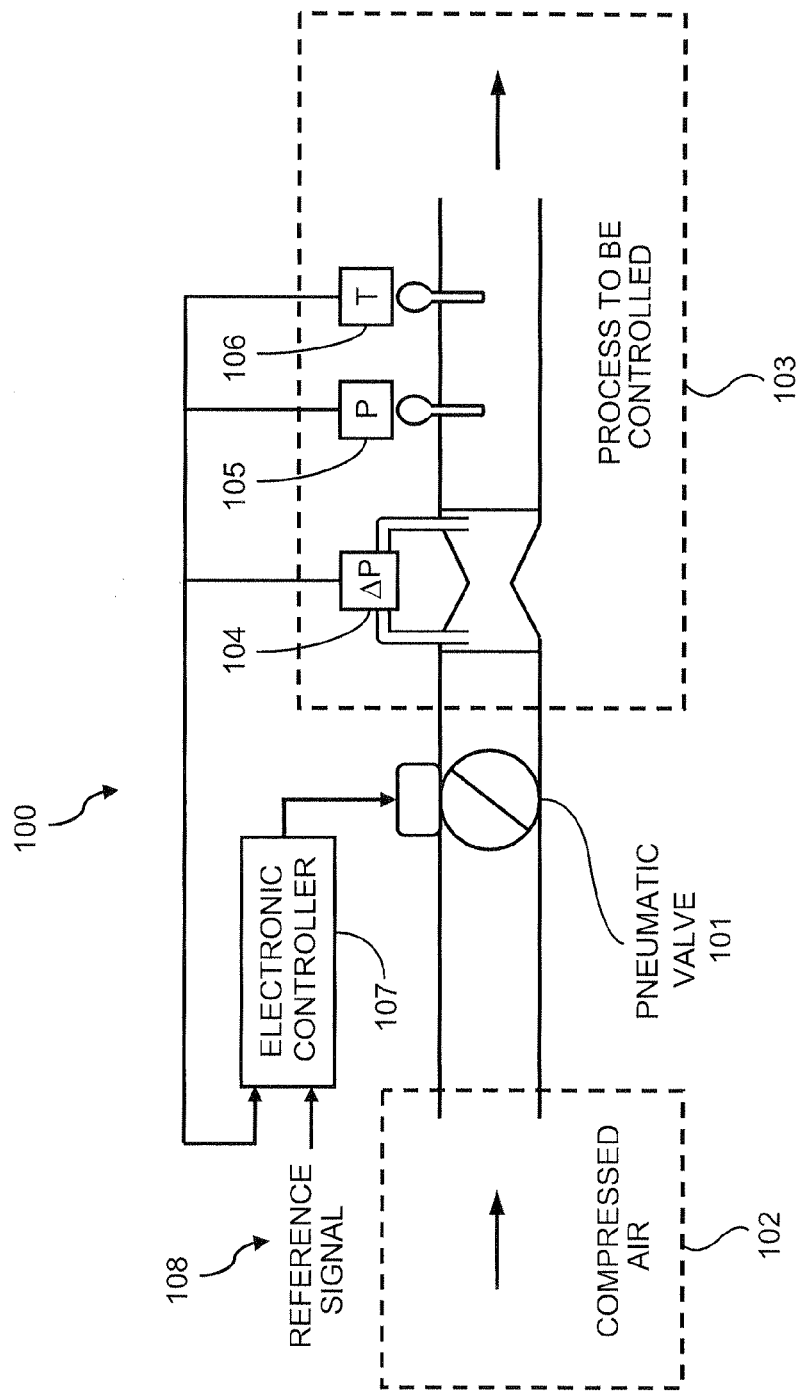
FIG. 1 schematically illustrates an exemplary illustrative non-limiting prior art closed loop pneumatic valve control system.

FIG. 1 shows an exemplary illustrative non-limiting closed loop process control system 100 performing a process controlled by a pneumatic valve 101. Control valve 101 modulates the restriction to airflow coming from a compressed air or other source 102. The opening state of valve 101 determines the amount of compressed air to be provided to a process to be controlled.

Downstream sensors 104, 105, 106 measure parameters associated with the compressed air flow being delivered to the process to be controlled. For example, a sensor 104 may measure flow rate; a sensor 105 may measure downstream air pressure; and a sensor 106 may measure downstream air temperature. The outputs of sensors 104, 105, 106 are provided to an electronic controller 107. Controller 107 takes the readings from these sensors and applies a control algorithm. The control algorithm may involve one or more control laws and be responsive to an external reference signal or value 108 or a schedule or the like. Controller 107 outputs a responsive control signal to control the opening state of pneumatic valve 101.

The state of the process to be controlled is generally not determined solely by the position of pneumatic valve 101. Generally speaking, loads, internal system changes and external disturbances can all affect the state of the controlled process to some degree. Even though electronic controller 107 may work in the context of the control loop to minimize differences between real and reference states, the process may nevertheless deviate from desired operation due to such external disturbances and effects.

Generally speaking, errors may be more visible during transients which can happen due to a sudden or other change (e.g., a step) in the reference state or system condition. During such transients, control and actuation parts should respond to the changes but may be driven out of their typical or comfortable ranges. It is during such transient operation that responses can be dramatically impacted by impending failures of elements such as pneumatic valve 101. Therefore, such transient conditions provide good opportunities to take measurements at instants when the transient effects are visible and repeatable, such as in a standardized test or step response.

Measurements performed by sensors 104, 105, 106 within process 103 can provide complementary information in the form of direct estimates of internal valve condition. However, it is also possible to estimate valve condition indirectly through available process variables. Furthermore, in accordance with one exemplary illustrative non-limiting implementation herein, the process variables associated with two or more similar pneumatic valves 101 can be monitored. The process parameters associated with such plural pneumatic valves 101 are compared to diagnose and prognose intended faults. Note that the sensors can but need not be placed within the valves, and are used to measure signals in the controlled process.

An additional desired system characteristic is that disturbances not related to degradation of pneumatic valves 101, such as those coming from supply air or environmental conditions, tend to influence all monitored valves in the same way. Residues and comparison results are generally more robust to disturbances dominated by common mode components. This is often the case with aircraft pneumatic valves 101, which can be employed in symmetrical or redundant arrangements on the same or different aircraft.

Figure 2:
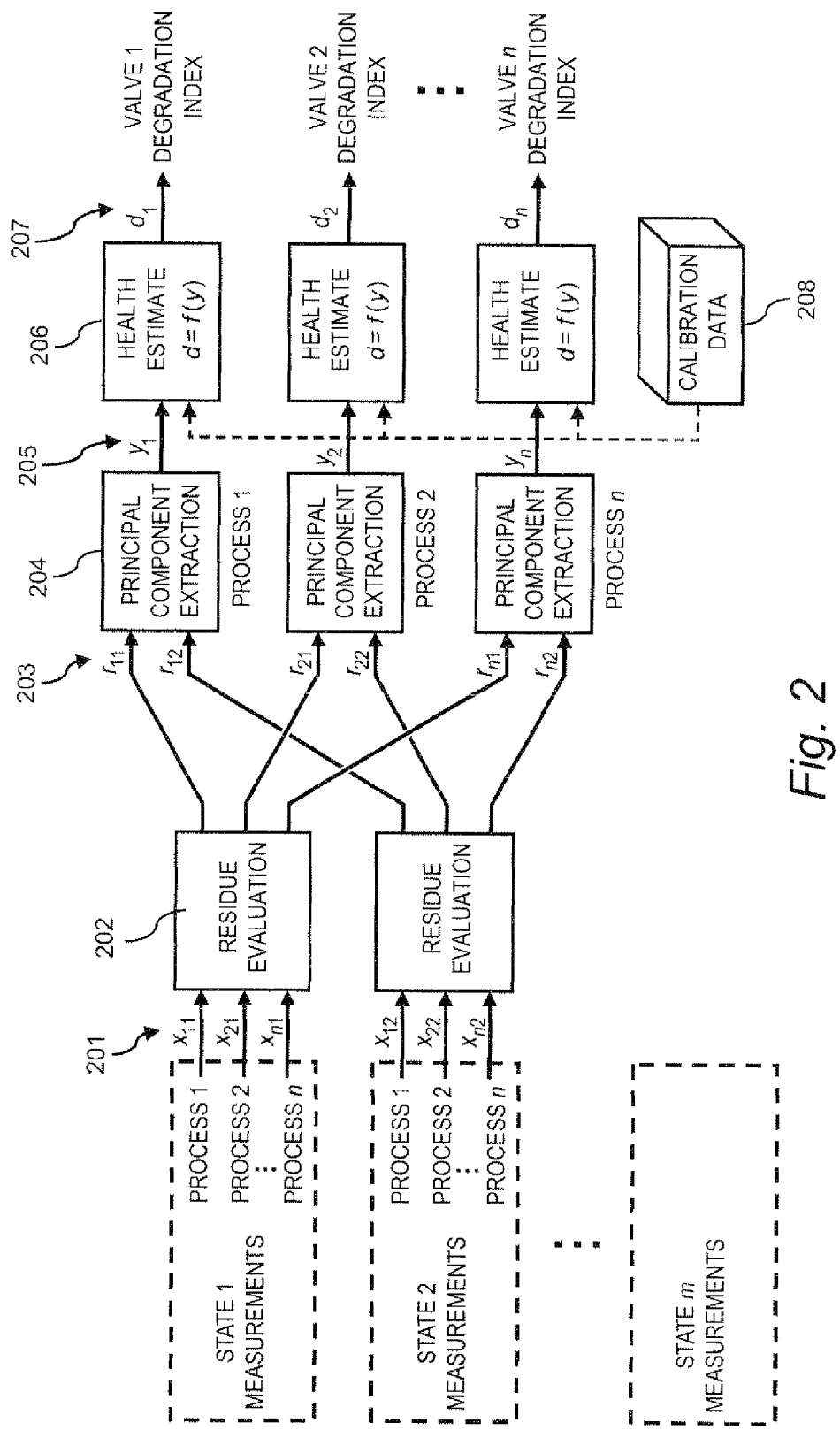
FIG. 2 illustrates graphically an exemplary non-limiting algorithm for determining valve degradation indices.

FIG. 2 shows exemplary illustrative non-limiting algorithms for translating sensor measurements into valve degradation indices. In the exemplary illustrative non-limiting implementation shown, state measurements $x_{ij}$ (201) (sensor $j \in \{1, 2, \ldots, m\}$ from process $i \in \{1, 2, \ldots, n\}$) are compared and evaluated at block 202 to generate residues or comparison results. Each sensor j measures a physical state including but not limited to for example temperature, pressure, flow rate or any other state capable of being measured. Each process i under test provides such physical state measurements. As will be explained below, exemplary illustrative residues or comparison results are obtained from the comparison of the measurements of the same or similar types of sensors installed at the same or similar positions.

Figure 3B:
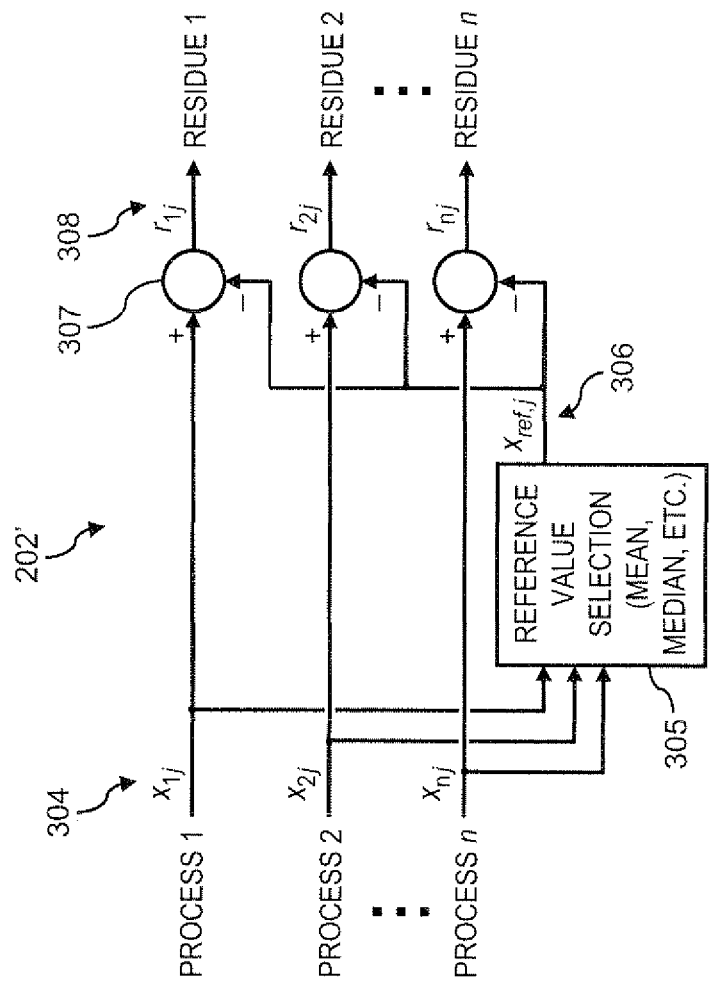
FIGS. 3A and 3B show exemplary illustrative non-limiting comparison evaluation operators.
Figure 3A:
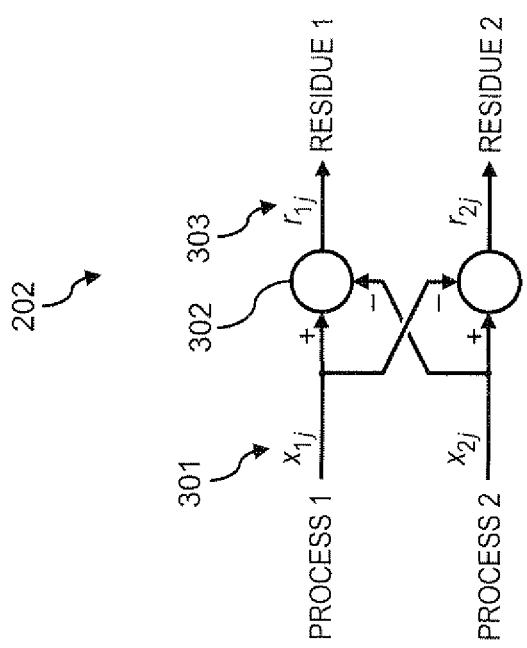

FIGS. 3A and 3B show examples of the residue evaluation block 202. As can be seen, residue evaluation block 202 can compare process measurements against reference values, which in turn may be based on measurements from other processes. Common mode disturbances, which affect all processes equally and are generally not related to failure precursors in the valves 101, can be removed using relatively simple operations. Resulting residues from the comparisons are thus free from common mode components and are more directly related to valve condition.

FIG. 3A shows an example where two valve operations are being monitored and compared. This situation can be applied to (a) the operation of two different valves that are simultaneously monitored; (b) the operation of the same valve monitored at different times (e.g., before and now, or at time T1 and at time T2 later than T1); and/or (c) the operation of two different valves monitored at different times (e.g., historical information from monitoring a first valve on a first airplane, and historical information from monitoring a second valve on a second, different airplane). When two valves are available, it is possible to compare one against the other. When more than two valves are available, more complex comparison can be performed.

In this case, the residues $r_{1j}$, $r_{2j}$ (303) are calculated by difference operators 302 which determine the differences between the measurements $x_{1j}$, $x_{2j}$ (301) of the two processes. The following exemplary formulas may apply:

$$r_{1j} = x_{1j} - x_{2j} \quad (1)$$

$$r_{2j} = x_{2j} - x_{1j} \quad (2)$$

When more than two valve 101 operations are monitored or analyzed, the residues $r_{ij}$ (308) shown in FIG. 3B can be extracted or derived from the differences (307) between the measurements $x_{ij}$ (304) and a reference value $x_{ref}$ (306) in accordance with a formula:

$$r_{ij} = x_{ij} - x_{refj} \quad (3)$$

The reference values $x_{refj}$ may depend on measurements $x_{1j}, x_{2j}, \ldots, x_{nj}$ and can be generated from a mean, a median or other algorithm or statistical method (305).

The residues $r_{ij}$ (203) resulting from the comparisons often present a significant degree of correlation. For example, a pressure drop may generally be associated with a temperature drop.

In the exemplary illustrative non-limiting implementation, the principal component extraction stage (204) converts the residues $r_{ij}$ into a single component $y_i$ (205) for each pneumatic valve 101 under test. An exemplary illustrative non-limiting mathematical formula is used to translate $r_{ij}$ into $y_i$. This mathematical formula may be based for example on a theoretical model, a statistical analysis such as PCA (principal component analysis), or any other model or analysis as known to those skilled in the art. The selected component $y_i$ should desirably be calculated in a way to carry desired information related to the degradation of a valve 101. If the process has only one state measurement available, only one residue can be calculated and the principal component extraction 204 may not be needed.

In the exemplary illustrative non-limiting implementation, the principal component $y_i$ associated with the valve 101 is converted (at block 206) into a valve degradation index $d_i$ (207). This conversion may be performed in accordance with a mathematical function $d=f(y)$ to provide a health estimate. The function used to translate the principal components $y_i$ into a valve degradation index $d_i$ can be based on a physical model, or it can be created entirely using empirical results, or a combination of these and other functions. Whichever the case, the coefficients of the mathematical function are read from a database (208). The mathematical function used for block 206 can be selected to distill into a single $d_i$ value a good and reliable indicator of valve degradation.

Figure 4:
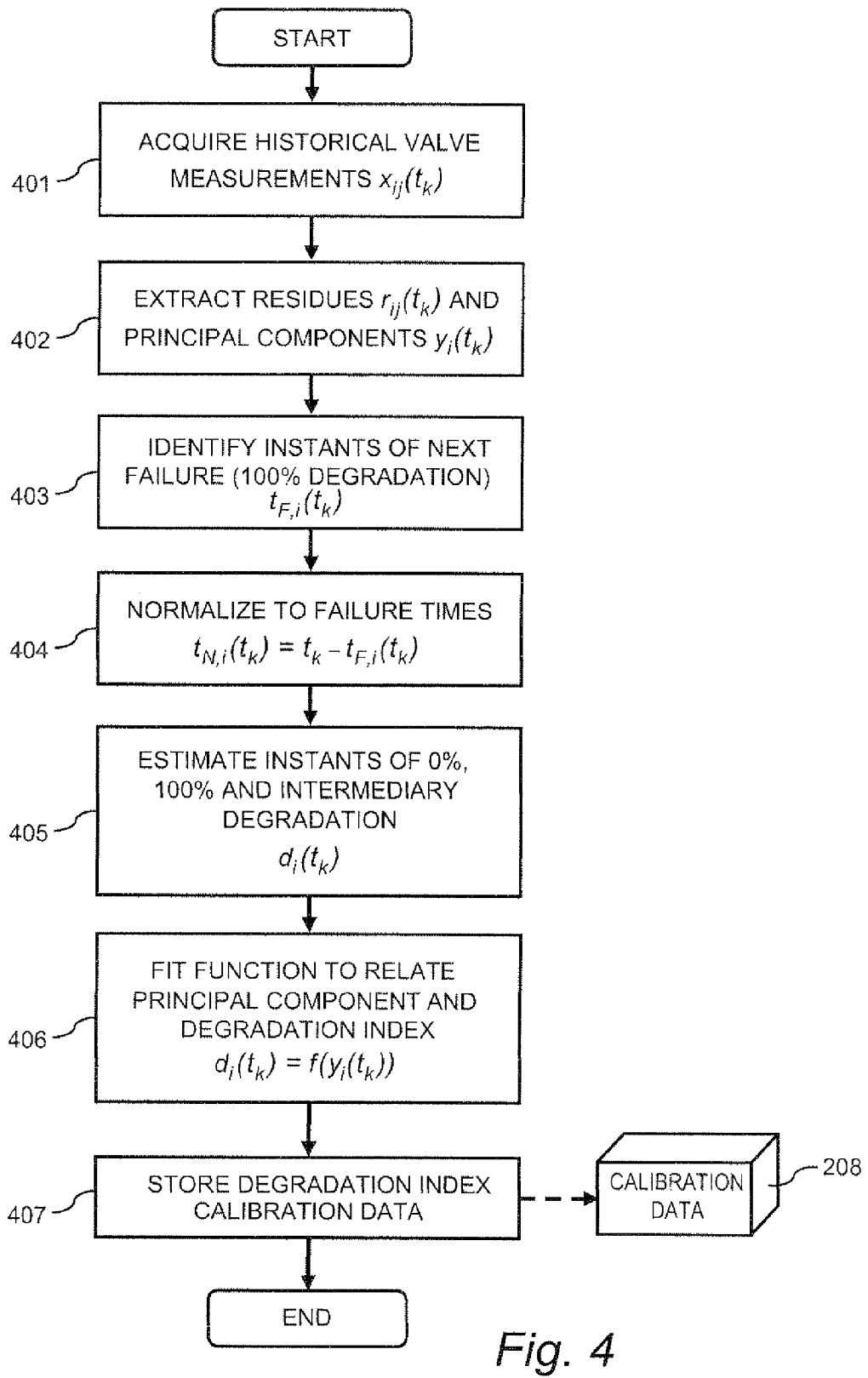
FIG. 4 is a flowchart of an exemplary illustrative non-limiting algorithm for calibrating the function that translates state comparison results into valve degradation index.

FIG. 4 shows an exemplary illustrative non-limiting method to create the degradation function using historical measurements that preceded failure events. Note that the method shown in FIG. 4 can but does not need to happen at the same time as the monitoring; it can be performed later as a separate offline step. In the example illustrative non-limiting implementation, past data are analyzed to determine the function that calculates degradation. In more detail, FIG. 4 shows the relationship between comparison results and valve degradation index. A function is fitted, but the extrapolation of time of failure does not necessarily result from this function. A first step (401) is to acquire the measurements as a function of time, $x_{ij}(t_k)$. The next step is to extract or derive residues or comparison results $r_{ij}(t_k)$ and principal components $y_i(t_k)$ (block 402) of a single valve according to the steps described above.

The instance of next failure $t_{F,i}(t_k)$ can be known beforehand or identified (block 403) from historical data.

A normalized time-to-next-failure $t_{N,i}(t_k)$ can be derived (block 404) from the failure times as follows:

$$t_{N,i}(t_k) = t_k - t_{F,i}(t_k) \quad (4)$$

This time to failure is used to estimate degradation (405) as a function of time, $d_i(t_k) = d(t_{N,i}(t_k))$. The valve is supposed to be fully degraded ($d_i(t_k)=1$ when $t_k=t_{F,i}(t_k)$) when failed when and not degraded until the time $t_0$ when a change is observed (associated with the onset of a fault, or incipient failure) in the extracted principal components. The criterion to choose this time $t_0$ can be based on a statistical analysis of $y_i(t_k)$ or other algorithm. Between instants $t_{N,i}(t_k)=t_0$ and $t_{N,i}(t_k)=0$, degradation $d_i(t_k)$ is interpolated linearly from 0 to 1.

Having the estimated degradation $d_i(t_k)$ and the extracted principal components $y_i(t_k)$ from several valves preceding several historical failure events on the same or different aircraft, a curve fitting technique (406) can be applied to model the degradation as a function of the principal component: $d_i(t_k)=f(y_i(t_k))$. The general format of f can be linear, polynomial, exponential, logarithmic or any other function appropriate to the failure mechanism taking place, as long as it increases or decreases monotonically. The coefficients of this function can then be stored (407) in a database (208) and be used to calculate valve degradation in the final step (206) of FIG. 2.

Figure 5A:
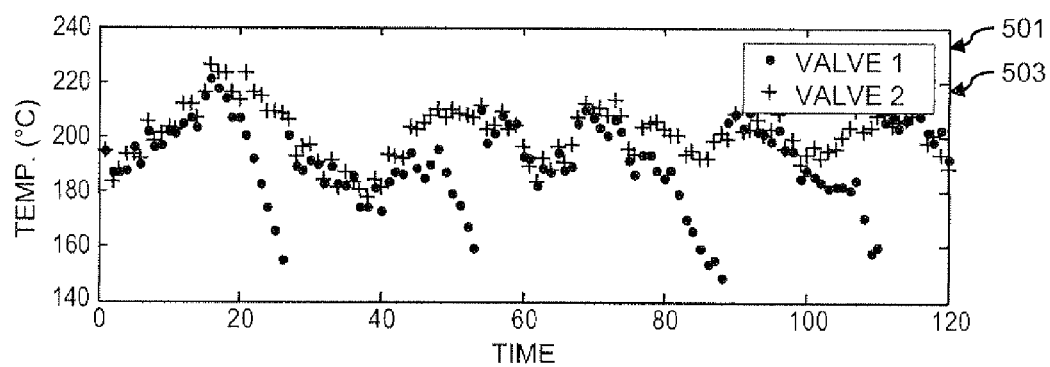
FIGS. 5A and 5B show exemplary illustrative historical measurements from a valve control system.
Figure 5B:
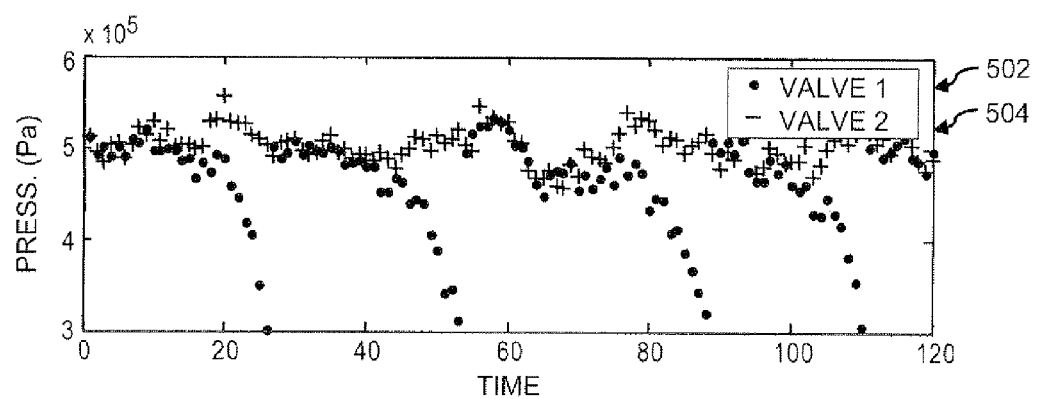
Figure 6A:
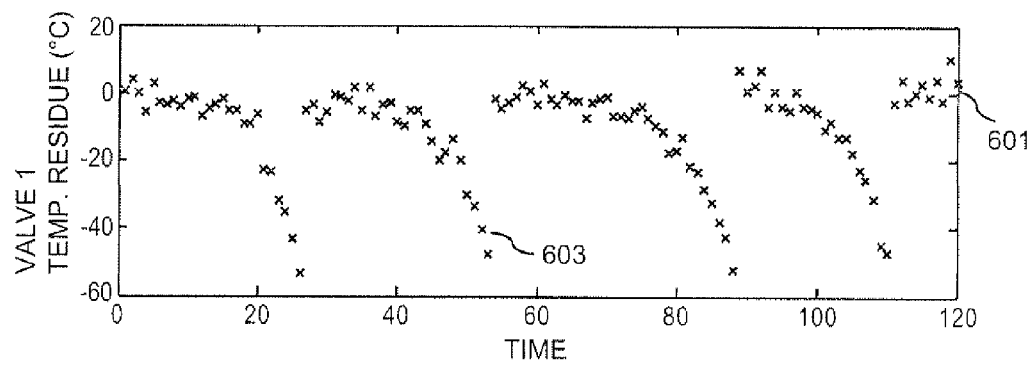
FIGS. 6A and 6B show exemplary illustrative non-limiting comparisons between two valve control system operations.
Figure 6B:
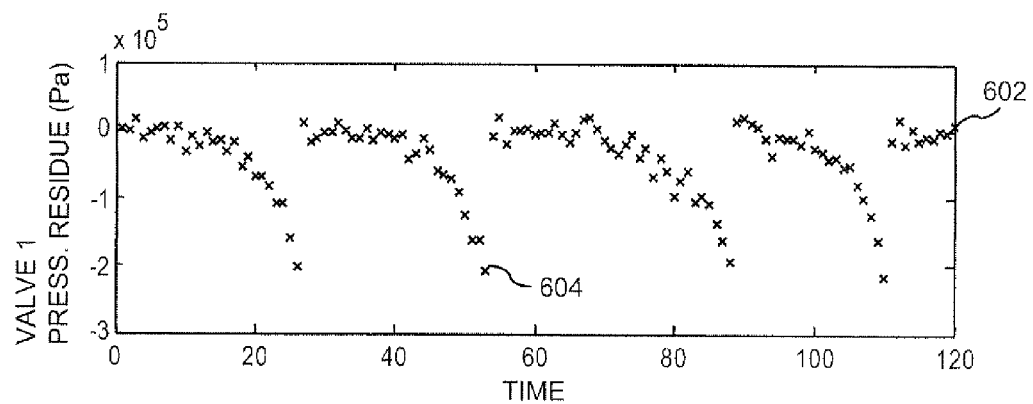
Figure 7A:
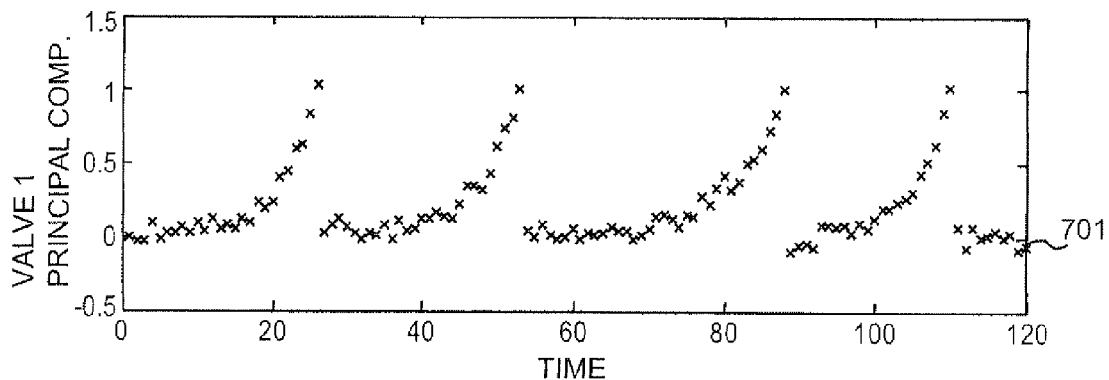
FIGS. 7A and 7B show exemplary illustrative non-limiting graphical valve degradation analysis results.
Figure 7B:
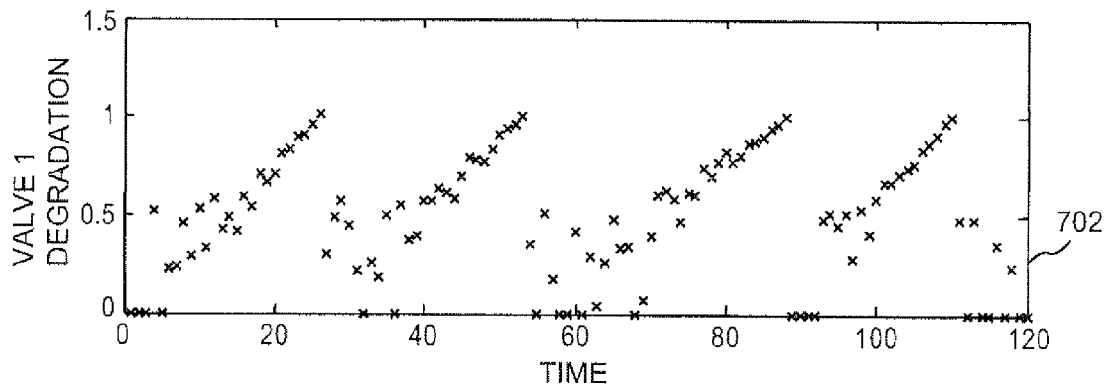

FIG. 5, FIG. 6 and FIG. 7 illustrate the exemplary signals of a condition monitoring system of two pneumatic valves, from which temperature and pressure are measured. In FIG. 5, temperature $x_{11}$ (501) and pressure $x_{12}$ (502) from valve 1 and temperature $x_{21}$ (503) and pressure $x_{22}$ (504) from valve 2 are plotted as a function of time. In this example, four failure events happen for valve 1; valve 2 is fully healthy during the events. FIG. 6 shows the valve 1 residues of temperature $r_{11}$ (601) and pressure $r_{12}$ (602); they are visibly less affected by the undesired common-mode disturbances than the raw measurements, yet keeping the necessary information related to degradation. Failures can be noticed by the pressure drops (603) and the correlated temperature drops (604). In FIG. 7, the principal component $y_1$ (701) of valve 1 and the estimated degradation $d_1$ (702) are shown. It can be seen that the estimated degradation in this example is clearly visible above 50% and advances at a fairly constant rate until about 100%, when the valve fails.

Figure 8:
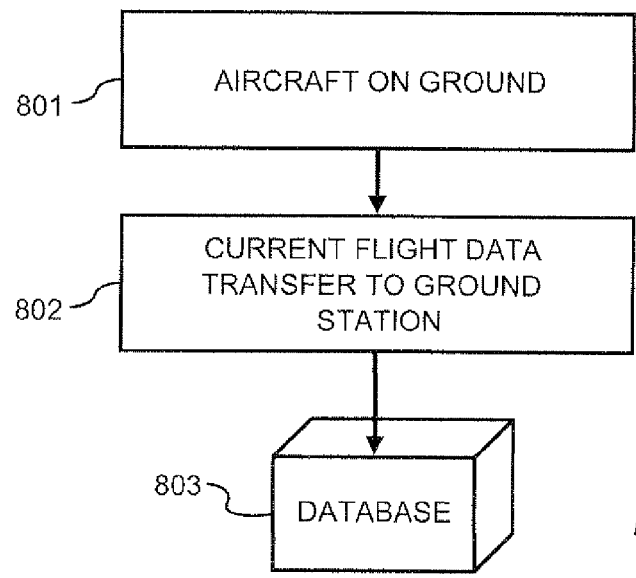
FIG. 8 shows a technique for sending comparison results to ground-based systems.

FIG. 8 shows an exemplary illustrative non-limiting processing arrangement for obtaining sensor data on board an aircraft and inserting it into a database 803. In this case, the aircraft arrives at the airport (block 801). Sensor information the aircraft has acquired in flight is transferred to a processing station (block 802). These transferring processes can be manual or automatic. The collected data is written into a database (block 803) located at the ground station. The process may be repeated for each aircraft landing. By collecting data from the control systems of different aircraft, it is possible to determine degradation in the process control system of a particular aircraft.

Figure 9:
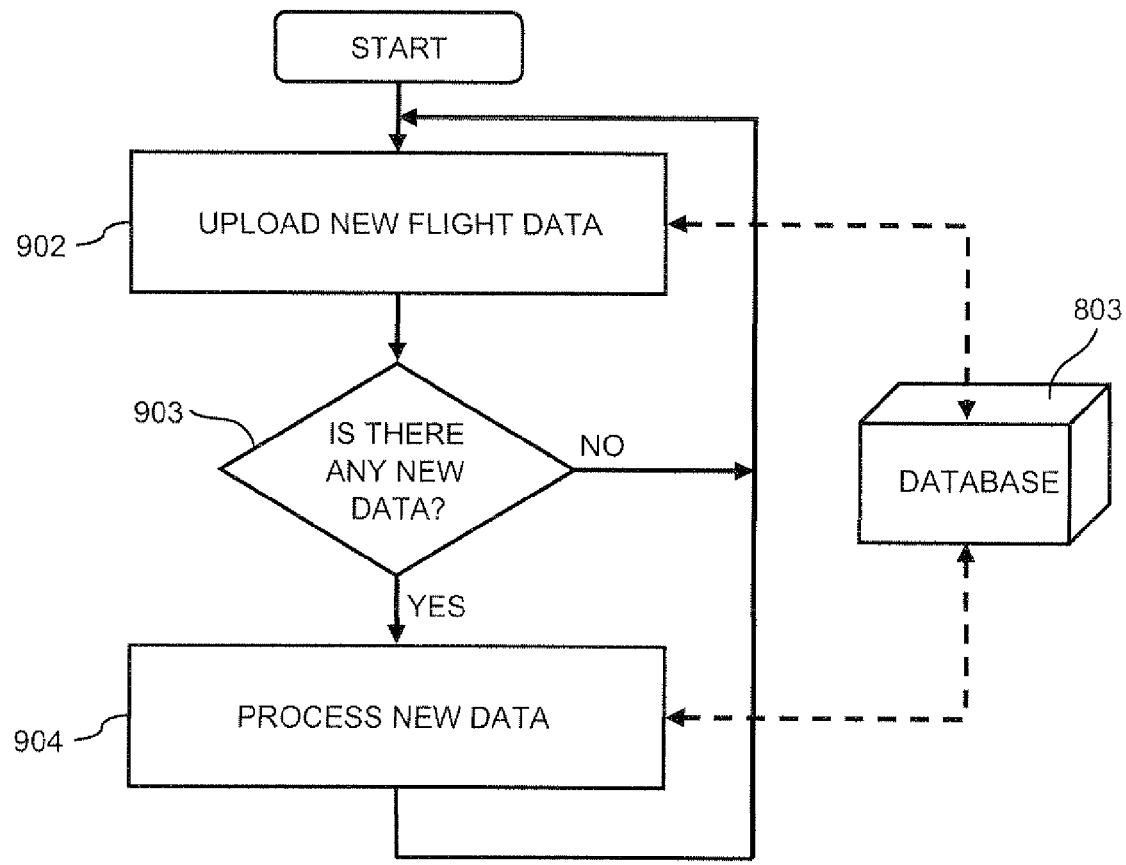
FIGS. 9 and 10 show exemplary illustrative non-limiting algorithms for maintaining measurement information and alerting pilots and maintenance crew of problems.

FIG. 9 shows an exemplary illustrative non-limiting processing arrangement for manipulating the data within the FIG. 8 database 803. The FIG. 9 process can be operated independently of the process described in FIG. 8 and may be continuously running. The first step (block 903) is to check whether any new data has been written into database 803. If not, the exemplary process may enter a loop until new data is inserted. When the checking detects a new database upload, the new uploaded data is processed (block 904) according to the mechanism described above to generate the state of health of the system. These results are stored in database 803 and the process returns to new data checking.

Figure 10:
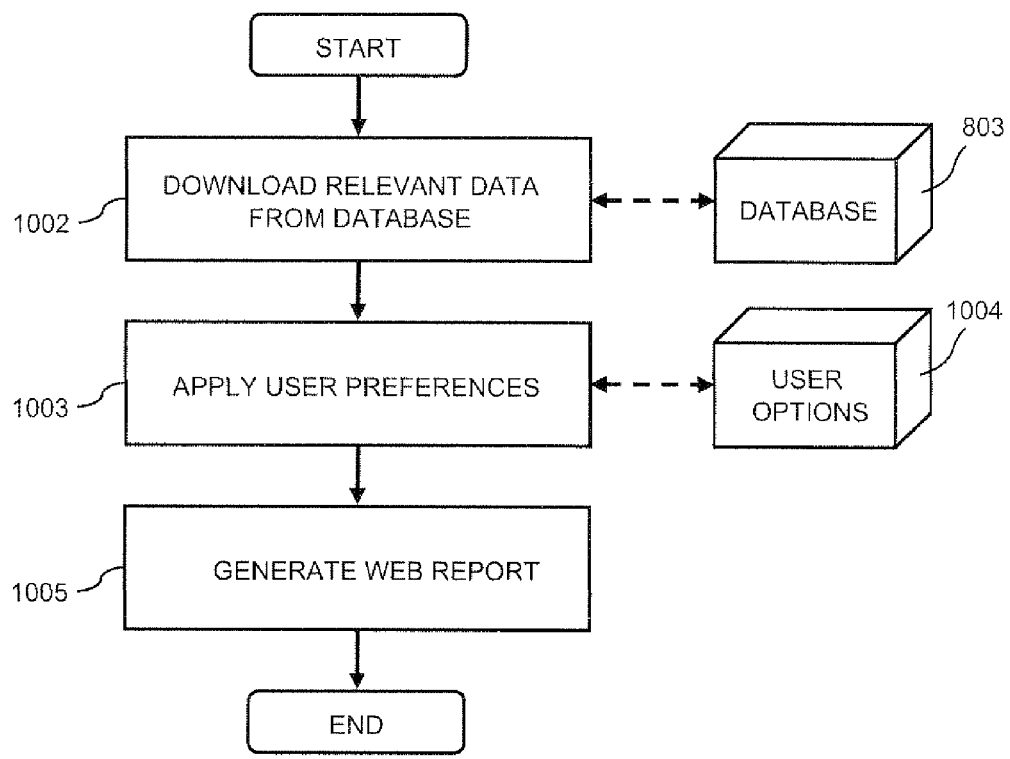

FIG. 10 shows an exemplary illustrative non-limiting processing arrangement to present results at an operator station. The FIG. 10 process can be performed independently of the ones shown in FIGS. 8 and 9, and may run only when the operator accesses the user interface. The first step (block 1002) downloads relevant data from database 803. The process then determines (block 1003) alerting results based on user preferences (block 1004). Such user preferences may use, for example, parameters provided from user options which can be edited by the operator and stored at an operator station or the processing station. Such results may be presented in a web report (block 1005) generated at a display or by way of other visual, aural or tactile indication.

Figure 11:
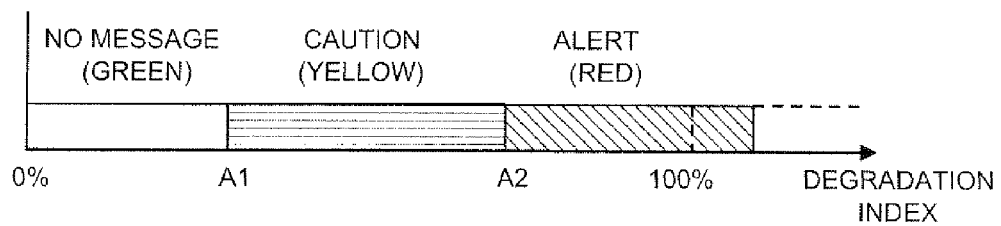
FIG. 11 shows exemplary illustrative non-limiting visual indicator.

An exemplary illustrative non-limiting alert system can provide an indication such as shown in FIG. 11. As degradation increases, the displayed (bar) region may go from "No Messages" to "Caution" and "Alert". Constants A1 and A2 may be parameters that define the alerting intervals. These numbers may be defined by a user interface to the operator. For example, an "alerting sensitivity level" available at the presentation may provide user defined input options such as "high", "medium" and "low". A "high" input option may set A1 and A2 with lower values, a "low" option may set A1 and A2 to higher values. The "medium" option may define those parameters as intermediate values.

While the technology herein has been described in connection with exemplary illustrative non-limiting embodiments, the invention is not to be limited by the disclosure. For example, while the techniques above are described in connection with closed loop pneumatic valve control systems, other applications (e.g., open loop systems, control systems using other than pneumatic valves, etc.) are also possible. In addition, while the techniques described above are especially suited for ground analysis of data collected from an airplane in flight, other arrangements (e.g., other than aviation applications, on-board analysis, etc.) are also possible. Also, control signals generated by the electronic system controller may be used as well as measured states to create degradation indexes. The invention is intended to be defined by the claims and to cover all corresponding and equivalent arrangements whether or not specifically disclosed herein.

We claim:

1. A method of assessing the health of first and second pneumatic valves used onboard aircraft, comprising:
monitoring a first process controlled by a first pneumatic valve;
monitoring a second process controlled by a second pneumatic valve;
using an electronic controller, comparing the monitored first process controlled by the first pneumatic valve with the monitored second process controlled by the second pneumatic valve to derive residues with reduced common mode components; and
using the at least one electronic controller, ascertaining at least one parameter associated with the health of at least one of the first pneumatic valve and the second pneumatic valve in response at least in part to said derived residue, including evaluating the residues derived from the first and second processes by comparing reference values against the residues with reduced common mode components.

2. The method of claim 1 further including using the at least one electronic controller to monitor the states of multiple processes, each controlled by a corresponding different pneumatic valve, and comparing states of said multiple processes controlled by said corresponding pneumatic valves to obtain the comparison results.

3. The method of claim 1 wherein said first process controlled by said first pneumatic valve is performed on a first aircraft, and said second performed by said second pneumatic valve is performed on a second aircraft different from said first aircraft.

4. The method of claim 1 wherein evaluating comprises calculating said comparison based on a reference value selection.

5. The method of claim 1 wherein the valves are identical and operate in different flow circuits under the same conditions.

6. A system for assessing the health of a pneumatic valve controlled system, comprising:
means for monitoring the states of a first process controlled by a first pneumatic valve;
means for monitoring the states of a second process controlled by a second pneumatic valve which is a different valve from the first pneumatic valve;
means including at least one electronic controller for comparing the monitored states of the first process with the monitored states of the second process to derive at least one residue with reduced common mode components;
means including the at least one electronic controller for ascertaining at least one parameter associated with the health of at least one of the first pneumatic valve and the second pneumatic valve in response at least in part to said derived residue, including, residue evaluating means for comparing the derived residue against a reference value.

7. The system of claim 6 further including means for monitoring the states of multiple processes, each controlled by a corresponding pneumatic valve, and wherein said means for comparing uses said states of said processes controlled by said corresponding pneumatic valves to obtain the comparison results by comparing states of different valves.

8. The system of claim 6 wherein said first-mentioned monitoring means is disposed on a first aircraft, and said second-mentioned monitoring means is disposed on a second aircraft different from said first aircraft.

9. The system of claim 6 further including means for calculating said comparison based on a reference value selection.

10. A system for assessing the health of a pneumatic valve controlled system, comprising:
at least one first valve sensor that monitors the states of a first process controlled by a first pneumatic valve;
at least one second valve sensor that monitors the states of a second process controlled by a second pneumatic valve, the second valve being disposed in a different circuit than the first valve;
at least one electronic controller structured to compare the monitored states of the first process against the monitored states of the second process to derive at least one residue with reduced common mode components, and to ascertain at least one parameter associated with the health of at least one of the first pneumatic valve and the second pneumatic valve in response at least in part to said derived residue, including a residue evaluating block that compares the derived residue from the first and second processes against a reference value.

11. The system of claim 10 wherein the valves are identical and operate in different flow circuits under the same conditions.

12. A non-transitory storage device storing instructions for execution by at least one electronic controller, the instructions being structured to use results of monitoring the states of a first process controlled by a first pneumatic valve and the states of a second process controlled by a second pneumatic valve to assess the health of a pneumatic valve controlled system onboard at least one aircraft, the first and second pneumatic valves being disposed in different flow arrangements, the instructions when executed by at least one electronic controller control the electronic controller to:

- compare the monitored states of the first process with the monitored states of the second process to derive at least one residue;
- ascertain at least one parameter associated with the health of at least one of the first pneumatic valve and the second pneumatic valve in response at least in part to said derived residue, including evaluate the residue derived from the first and second processes against a reference value.

13. The storage device of claim 12 wherein the valves are identical and operate in different flow circuits under the same conditions.

\* \* \* \* \*